United States Patent [19]

Nebesh et al.

[11] Patent Number: 5,035,793
[45] Date of Patent: Jul. 30, 1991

[54] HYDROTREATING CATALYST AND PROCESS

[75] Inventors: Eugene Nebesh, Parma; Robert A. Plundo, Hudson; Steven L. McMahon, Macedonia, all of Ohio

[73] Assignee: Engelhard Corporation, Edison, N.J.

[21] Appl. No.: 551,436

[22] Filed: Aug. 3, 1990

Related U.S. Application Data

[62] Division of Ser. No. 197,455, May 23, 1988, Pat. No. 4,957,895.

[51] Int. Cl.$^5$ .............................................. C10G 45/00
[52] U.S. Cl. .................................... 208/143; 208/144; 208/145
[58] Field of Search ............... 208/143, 144, 145, 115; 502/228, 221, 224, 254, 258, 263

[56] References Cited

U.S. PATENT DOCUMENTS

| | | | |
|---|---|---|---|
| 3,046,218 | 7/1962 | Henke et al. | 208/109 |
| 3,078,218 | 2/1963 | Beuther et al. | 208/143 |
| 3,078,238 | 2/1963 | Beuther et al. | 252/439 |
| 3,493,493 | 2/1970 | Henke et al. | 208/264 |
| 3,553,107 | 1/1971 | Donaldson et al. | 206/271 |
| 3,673,112 | 6/1972 | Levinson | 252/441 |
| 4,013,545 | 3/1977 | Hilfman | 208/143 |
| 4,013,548 | 4/1977 | Pollitzer et al. | 208/143 |
| 4,046,714 | 9/1977 | O'Hara | 252/455 R |
| 4,085,035 | 4/1978 | Wristers | 208/143 |
| 4,330,395 | 5/1982 | Pott et al. | 208/143 |
| 4,427,534 | 1/1984 | Brunn et al. | 208/89 |

Primary Examiner—Helane E. Myers
Attorney, Agent, or Firm—Renner, Otto, Boisselle & Sklar

[57] ABSTRACT

A hydrotreating catalyst is described which comprises at least one Group VI metal, metal oxide, or metal sulfide, and at least one Group VIII metal, metal oxide, or metal sulfide, supported on a carrier wherein (A) the catalyst comprises from about 10% to about 35% by weight of combined metal, and the atomic ratio of the Group VIII metal to Group VI metal is in the range of from about 0.5:1 to about 2:1; (B) the carrier comprises from about 0.5 to about 10 weight percent of halogen, from about 0.5 to about 5% by weight of silica and from about 85 to about 99% of alumina; and (C) the catalyst is characterized as having a median pore radius of from about 30 to about 65 Angstroms, and a surface area of from about 120 to about 180 m$^2$/g. Also described are novel and improved procedures for preparing the catalyst is useful in the production of lubricating oils from crude hydrocarbon oil stocks in that the hydrotreating process results in the formation of oils having increased viscosity indexes, reduced aromatic content and improved stability. The catalysts of this invention can be used effectively in either or both stages of a two-stage hydrotreating process or in a single stage hydrotreating process. The nitrogen and sulfur contents of the oils also are reduced through the use of the catalyst in the hydrogenation process.

11 Claims, 1 Drawing Sheet

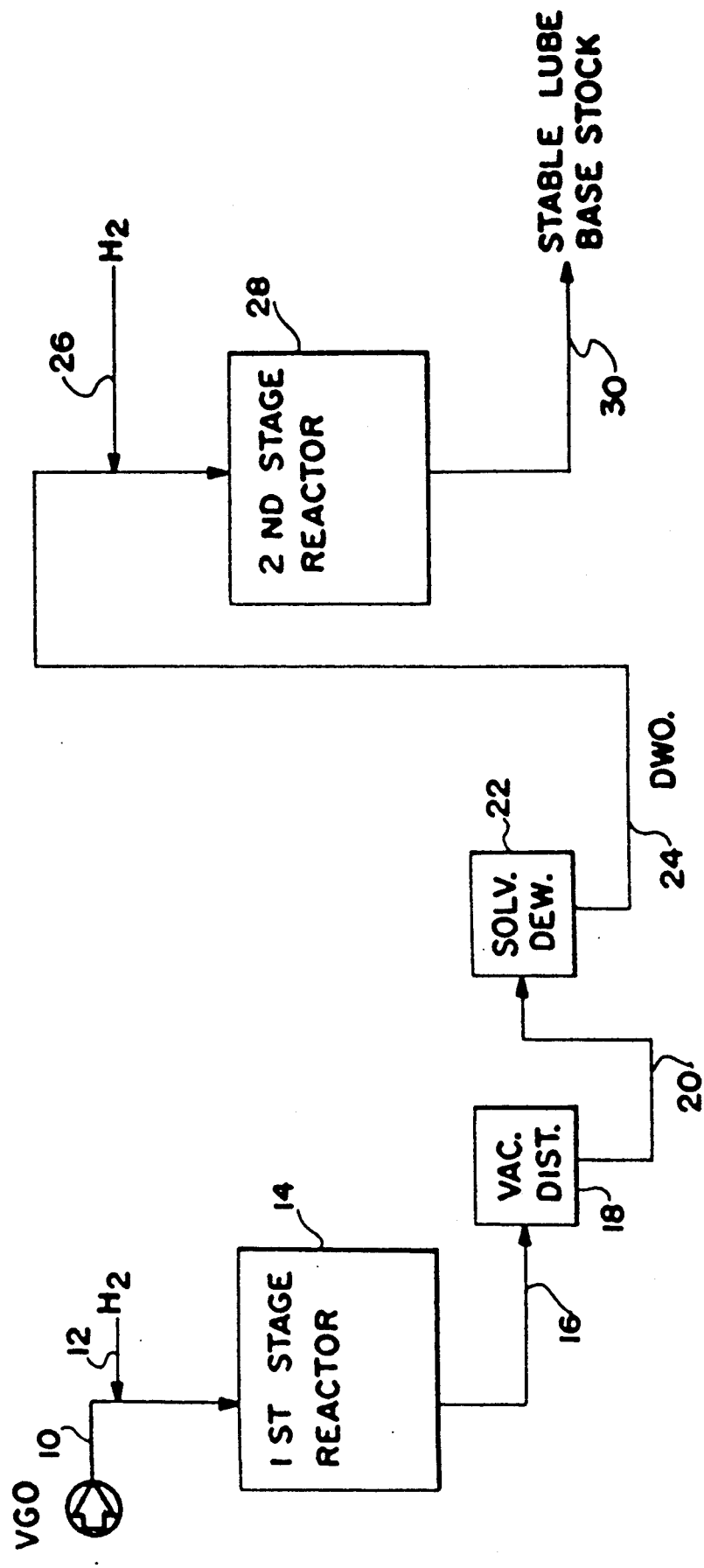

HYDROTREATING CATALYST AND PROCESS

This is a division of U.S. application Ser. No. 07/197,455, filed May 23, 1988.

TECHNICAL FIELD

This invention relates to hydrotreating catalysts, their preparation, and their use in hydrotreating hydrocarbon oils to improve the viscosity index and other properties of the oils and/or to reduce the aromatic content of the oils. More particularly, this invention relates to hydrotreating catalysts having unusual and improved characteristics, and the use of such catalysts for upgrading hydrocarbon oil charge stocks.

BACKGROUND OF THE INVENTION

Viscosity index, light stability, aromatics content and iodine number are measurements which are employed in lubricating oil specifications as general indicators of the quality of the oil. Viscosity index is a reflection of an oil's resistance to viscosity change with fluctuations in temperature. The higher the viscosity index of an oil, the more resistant it is to a viscosity change caused by temperature fluctuation. Iodine number is an indicator of the amount of unsaturated linkages appearing in the molecules present in the oil to which iodine can be added. Unsaturated linkages generally are undesirable because such linkages are more readily oxidized than saturated linkages, especially at elevated temperatures, and such oxidation results in degradation of the oil. Therefore, a high quality lubricating oil, i.e., one that is particularly desirable for automotive uses, should possess a relatively high viscosity index and a relatively low iodine number.

The stability of oils also is affected by the presence of aromatic materials in the oil. The aromatic content of oils can be reduced by hydrotreating or hydrocracking. Hydrotreating processes are preferred where it is desired to reduce aromatics without significantly increasing the amount of undesirable low boiling materials. Hydrotreating processes can be effective for the saturation of aromatic compounds to naphthenic materials without significant cracking or hydrocracking.

The upgrading of crude lubricating oil stocks by means of catalytic hydrogenation has been suggested in the art. Generally, the processes require, in a first stage, the treatment of the crude lubricating oil stocks with hydrogen under conditions of elevated temperature and pressure while employing a catalyst comprising hydrogenating components (metals) supported on a carrier having a substantial degree of cracking activity such as for example, alumina, silica, and mixtures thereof. Although many of the catalysts which have been suggested in the prior art provide some improvement, there continues to be a need for improved multifunctional catalysts which provide increased yields, higher viscosity indexes and reduced aromatics content under lower reaction temperatures.

The acidic or cracking function in the hydrotreating process usually is supplied by the catalyst support or the catalyst support enhanced by acidic promoters such as halogens. The hydrogenation activity of a supported catalyst is supplied by the hydrogenation metal component which may exist in the final catalyst as a metal, the metal ion complexed with the support structure and other promoters, or metal compounds, notably the oxides and sulfides. Typical hydrogenation metals are metals of Groups VIB and VIII of the Periodic Table of Elements.

The hydrogenation catalysts which are useful in hydrotreating crude oils generally serve a multiplicity of functions such as cracking, nitrogen removal, sulfur removal, metal removal, hydrogenation, etc. Various catalysts which have been suggested in the prior art will perform these functions to different degrees, and catalyst compositions have been designed and formulated to optimize their performance with respect to one or more of such functions. For example, catalysts have been suggested which are extremely useful in increasing the viscosity index and reducing nitrogen and sulfur content, but the same catalysts may not be very effective for reducing the aromatic content of the oil. Other catalysts have been designed to provide a minimum cracking of the oil and an increase in effectiveness in removing aromatics. These are normally used in the second stage of a two-stage process after the viscosity index has been increased and nitrogen and sulfur content reduced by use of a specially designed hydrotreating catalyst. Although such procedures are effective in producing the desired result, the processes do require the use of two different catalysts thereby requiring the maintenance of inventories of two different catalysts.

The physical properties of the catalysts useful in the hydrogenation reactions, in some instances, may be as important as the catalytic activity. To be useful, the catalyst must have sufficient mechanical strength to resist crushing and/or attrition in use. Since catalytic reactions generally occur at the surface of the catalyst, it is considered desirable that the catalyst have optimal surface area and pore volume. Thus, in the preparation of the catalysts, it is important to use supports of high surface areas and pore volumes because impregnation of a support with metals fills the pores and reduces the surface area.

Because of the continuing demands placed on the lubricating oil producers for improved products, the producers typically use two or more hydrotreating stages. A catalyst generally is selected for the first stage for its ability to hydrocrack the crude feedstock which typically is a vacuum gas oil. In the second and subsequent stages, a catalyst is chosen which is capable of polishing the oil with the occurrence of mild hydrogenation and aromatics removal. In general, cracking, (i.e., formation of lower boiling materials) is undesirable in the second stage.

Numerous publications, including patents, have discussed the catalytic hydrogenation of lubricating oil stocks. U.S. Pat. Nos. 3,078,238 and 3,046,218 describe a supported nickel-tungsten catalyst which has been treated with a halogen such as fluorine to improve the hydrogenation activity of the catalyst. The resultant catalyst contains at least 0.3% fluorine, and preferably 2.5% or more of fluorine. The catalyst support is preferably a mixture of alumina and silica. In the '238 patent, the catalyst composition comprises halogenated, sulfided supported nickel and tungsten wherein the carrier material possesses cracking activity. The amount of nickel and tungsten present in the catalyst should be a total of from 5% to about 40% of the total catalyst weight, and the nickel and tungsten are present in some form of combination or mixture with sulfur. The sulfur should be present in amounts of from about 2% to about 23% of the catalyst weight. The support materials are composites of silica and alumina and the materials may contain between 1% and 99% silica although compositions containing from 5% to 90% silica are more desirable, and the most desirable composites contain 65% to 90% silica. In U.S. Pat. No. 3,046,218, the catalyst support may be natural or synthetic high silica-low alumina catalyst or silica-alumina cracking catalyst which contain up to 50% alumina.

In Table I of U.S. Pat. No. 3,078,238, various catalysts containing various support compositions are identified containing various silica to alumina ratios including a catalyst support containing 5% silica and 95% alumina. This latter catalyst is reported to have a low cracking value resulting in a lube oil product having an undesirable high iodine number and a relatively low viscosity index which is about the same as the catalyst wherein the support composition is over 99.5% by weight of alumina. Based upon the results reported in the '238 patent, the patentees concluded that the catalyst should preferably have a cracking activity on the Kellogg scale of between 60 and 80 and that the support should be high-silica support comprising from 75-85% silica and from 25% to 15% alumina.

U.S. Pat. No. 3,553,107 discloses a hydrotreating catalyst and a process for treating lubricating oil stock containing from 5% to 30% aromatics by volume whereby the aromatic content of the oil is significantly reduced. The oil then is treated with fuming sulfuric acid, neutralized with caustic, and extracted with alcohol to remove sulfonates and yield a white oil. The hydrotreating catalyst used to reduce the aromatic content in the lubricating oil stock employs Group VI and Group VIII metals on an alumina support. Preferred catalysts include combinations of nickel and tungsten in amounts of from 10% to about 30% by weight and preferably about 25%. In another preferred embodiment, the catalyst is composed of 20% nickel, 20% tungsten and 2% fluorine on alumina.

U.S Pat. No. 3,493,493 describes hydrotreating catalysts useful for enhancing lubricating oils. The catalysts comprise at least one Group VI metal and one Group VIII metal on an alumina carrier having a cracking activity index of less than about 30 and containing halogen. The total metals content of the catalysts is at least 20% by weight, and the atomic ratio of Group VIII metals to Group VI metals is in the range of from about 2.25:1 to about 6:1. The carrier employed in the invention must be alumina which has low activity for the promotion of cracking. The effectiveness of the catalysts claimed in this patent is compared to catalysts using different supports containing mixtures of alumina and silica including supports comprising 75% silica and about 25% alumina.

U.S. Pat. No. 4,427,534 describes the process for the production of a jet or diesel fuel from aromatics-containing feedstock. The process comprises contacting hydrogen and a feedstock with a presulfurized catalyst composite comprising a Group VIB metal, a Group VIII metal and a halogen impregnated on a cracking support under hydrogenation/hydrocracking conditions. The preferred carrier is a silica-alumina composite containing from about 65% to about 85% silica, preferably about 70-80% silica and 20-30% alumina.

SUMMARY OF THE INVENTION

A hydrotreating catalyst is described which comprises at least one Group VI metal, metal oxide, or metal sulfide, or mixtures thereof, and at least one Group VIII metal, metal oxide, or metal sulfide, or mixtures thereof supported on a carrier wherein (A) the catalyst comprises from about 10% to about 35% by weight of combined metal, and the atomic ratio of the Group VIII metal to Group VI metal is in the range of from about 0.5:1 to about 2:1; (B) the carrier comprises from about 0.5 to about 10 weight percent of halogen, from about 0.5 to about 5% by weight of silica and from about 85 to about 99% of alumina; and (C) the catalyst is characterized as having a median pore radius of from about 30 to about 65 Angstroms, and a surface area of from about 115 to about 180 $m^2/g$. Also described are novel and improved procedures for preparing the carrier or support used to prepare the catalysts. The catalyst is useful in the production of lubricating oils from crude hydrocarbon oil stocks in that the hydrotreating process results in the formation of oils having increased viscosity indexes, reduced aromatic content and improved stability. The catalysts of this invention can be used effectively in either or both stages of a two-stage hydrotreating process or in a single-stage hydrotreating process. The nitrogen and sulfur contents of the oils also are reduced through the use of the catalyst in the hydrogenation process.

BRIEF DESCRIPTION OF THE DRAWINGS

FIG. 1 is a schematic flow diagram of a typical two-stage process for hydrotreating a lubricating oil base stock.

DESCRIPTION OF THE PREFERRED EMBODIMENTS

The hydrotreating catalysts of the present invention comprise at least one Group VI metal, at least one Group VIII metal on a carrier support which comprises from about 0.5% to about 5% by weight of silica, from about 0.5 to about 10% by weight of halogen, and from about 85% to about 99% alumina. The metallic component of the catalyst can comprise any one or more of the Group VI metals together with any one or more of the Group VIII metals. Generally, the metals employed will be the chromium, molybdenum or tungsten metals of Group VI, and iron, cobalt or nickel metals of Group VIII. The metallic components can be employed either as the metals or as the oxides or sulfides of such metals or mixtures thereof. In one embodiment, a sulfided catalyst can be prepared from a catalyst wherein the metallic components are initially in a substantially unsulfided state such as, for example, a reduced metal state, the oxide of the metal or wherein the metals are only partially sulfided, and this catalyst can then be sulfided in situ, either before start-up or during the start-up of the hydrotreating process. The metallic components of the catalysts also may be combinations of, for example, nickel, cobalt and molybdenum; nickel, cobalt and tungsten; nickel and molybdenum, cobalt and molybdenum; cobalt and tungsten; and especially nickel and tungsten.

The total metal content of the catalyst of the present invention should be in the range of from about 10% to about 35% by weight, and in one preferred embodiment, the total metal content of the catalyst is from about 15% to about 35% by weight based on the total catalyst weight. In another embodiment, the total metal content is about 20% to about 30%.

The relative amount of the Group VI metal and Group VII metal present in the catalyst also is important and the atomic ratio of the Group VIII metal to Group VI metal should be maintained within the range of from about 0.5:1 to about 2:1. In one preferred embodiment, the atomic ratio of Group VIII metal to Group VI metal is in the range of from about 0.5:1 to about 1.5:1. In a more specific embodiment, the atomic ratio of Group VIII metal to Group VI metal is from about 0.75:1 to about 1.25:1.

The metals (Group VI and Group VIII) or a portion of the metal(s) can be incorporated into the catalyst by including the metals or a portion of the metals (such as up to about 50 or 60% of the total metal in the catalyst) in the mixture of silica and alumina used to form the support or carrier. Alternatively, and preferably, as will be described in more detail below, the support is first prepared and the metals are then impregnated into the preformed support.

The hydrotreating catalyst of the present invention also contains at least one halogen, and generally, the amount of halogen present is from about 0.5% to about 10% by weight based on a total weight of the catalyst. In one embodiment, the halogen content is from about 0.5% to about 7%, and more specifically from about 0.5% to about 5%. In one preferred embodiment, the halogen content is from about 1.5 to about 3.5 weight percent based on the weight of the catalyst. The presence of halogen increases the activity of the catalysts with respect to hydrogenation. Although any halogen such as chlorine, bromine or iodine may be used, fluorine is preferred.

The incorporation of the halogen in the support or carrier of the catalyst of this invention may be accomplished by preparing an formable mixture comprising alumina, silica and a halogen compound and forming the mixture into a support material. To this halogen-containing support then can be added the desired metals and additional halogen if desired.

Another feature of the hydrotreating catalyst of the present invention is the nature of the carrier or support. The carrier employed in the catalyst of the present invention generally comprises from about 0.5% to about 5% by weight of silica and from about 85% to about 99% of alumina. In one embodiment, the carrier comprises from about 0.75% to about 2.5% by weight of silica and about 95% to about 99% by weight of alumina. In a further embodiment, the carrier comprises from about 1.0% to about 5% by weight of silica, from about 1 to 3.5% of fluorine, and from about 95% to about 99% by weight of alumina. In addition to the Group VI and Group VIII metals and halogen which is present in the support as described above, other materials may be present in amounts of up to about 20% by weight of the total support material. Such materials include, for example, magnesia or titania. The carrier can also be modified to include other materials to increase the hydrocracking activity of the catalyst at lower temperatures.

The hydrotreating catalyst of the invention can be prepared employing any of the techniques for the preparation of multi-component catalysts known in the art. In one embodiment, the catalysts can be prepared by preparing a calcined halogen-containing silica-alumina carrier (with or without optional materials described above), and thereafter impregnating the calcined carrier with a solution (generally aqueous) containing the salts of the desired metals. Generally one impregnation step is sufficient to provide a catalyst containing the desired metal content although in some instances, particularly at the higher levels of metals, multiple impregnation steps may be utilized. Generally, water-soluble salts of the Group VI and Group VIII metals such as nitrates, oxalates, acetates, ammonium salts, etc., may be employed, and after the salts have been impregnated into the carrier, these salts will usually be converted to the corresponding metal oxides by calcining. Tungsten can be conveniently incorporated from the meta-tungstate such as, for example, ammonium meta-tungstate. Ammonium para-tungstate also is suitable. Molybdenum can be conveniently incorporated from a molybdate salt, e.g., ammonium molybdate. Nickel and cobalt are incorporated using water solutions of salts such as nickel nitrate hexahydrate, nickel acetate, nickel carbonate, cobalt nitrate hexahydrate, cobalt acetate, cobalt carbonate, etc.

Formation of the sulfide can be effected in any known manner. One satisfactory procedure is to contact the catalyst containing the oxides of the metals with a mixture of hydrogen sulfide and hydrogen at elevated temperatures. Complete sulfiding is not necessary, but generally, sulfiding to above about 5% is desirable.

The catalyst support is prepared generally by forming, e.g., extruding, aqueous mixtures comprising a halogen, silica, alumina and water (and other optional materials such as described above including a mineral acid) followed by drying and calcination. All types of aluminas, can be used in the preparation of the carrier. In one embodiment, the aluminas are pseudoboehmites and/or alpha-monohydrates with or without mixtures of calcined aluminas (chi or gamma). The halogen-containing compounds may be a halogen, a hydrogen halide or any halogen-containing silica compound such as the halosilicic acids. The silica used to form the catalyst support may be silica, silicic acid, silica sols, silica-alumina, fluosilicic acid, etc. Fluorine is a preferred halogen, and fluosilicic acid ($H_2SiF_6$) is a preferred material for use in the invention since it includes both fluorine and silica. Water is used in the preparation of the silica-alumina mixture in order to provide the desired consistency for forming the mixture. The amount of water added to the mixture will depend upon the nature and source of the silica and alumina as well as the type of mixer and forming apparatus being utilized. The amount of water as well as the preferred consistency of the mixture can be readily determined by one skilled in the art. The formable mixtures may also contain a mineral acid, and when present, the amount of acid should be sufficient to peptize the alumina. Up to about 10% by weight of the mineral acid based on the weight of the alumina may be included in the formable mix. Any of the well known commercially available mixers and forming apparatus can be used in the preparation of the carrier support so long as they produce catalysts with sufficient physical integrity. Although it is generally preferred to extrude the mixtures to form the support, other forming techniques such as tableting, briquetting, etc., can be used. Thus, when reference is made in this specification and in the claims to extruding, extrusion, extrudate, etc., the terms include other forming techniques.

In one embodiment, the carrier or substrate comprising silica, alumina and fluorine is prepared by the steps of (A) preparing a solution of fluosilicic acid in water;

(B) preparing a mixture of alumina and the solution prepared in step (A);

(C) forming the mixture to form a desired shape; and (D) drying and calcining the formed mixture at an elevated temperature to develop the desired porosity. In another embodiment, a mineral acid is incorporated into the solution in step (A).

An important feature of this invention is the use of the fluosilicic acid as the source of halogen and silica for the carrier or support. The amount of fluosilicic acid included in the solution prepared in step (A) is an amount which will be sufficient, when mixed with alumina in the second step to provide a catalyst carrier containing from about 0.5 to about 5% of silica and up to about 10% of fluorine. The mineral acid which may be utilized in the first step may be any mineral acid although nitric acid generally is utilized. The amount of nitric acid which may optionally be included in the solution prepared in step (A) is an amount which will be sufficient to peptize the alumina when mixed with the alumina in step (B). This amount may be up to about 10% by weight based on the weight of the alumina, more often as an amount of up to about 3% by weight. In one embodiment, the mixture prepared in step (B) will comprise on a dry basis, from about 0.5 to about 5 parts by weight of silica, 0.5 to about 5 parts by weight of fluorine and about 85 to 99 parts by weight of alumina. The mixture prepared in step (B), as mentioned above, also may contain other materials such as magnesia, titania, or mixtures of magnesia or titania.

The extrudate which is obtained by extruding the above-described mixtures may be, and generally is dried before it is calcined at an elevated temperature. The extrudates are calcined at temperatures of at least about 400° C. and more generally at temperatures of from 500° to about 600° C. although temperatures as high as 1200° C. can be utilized. It generally has been observed that it is preferred to utilize lower calcination temperatures where smaller pores are desired.

The size and shape of the extruded support can be varied over a wide range although the size generally is from about 1/64-inch to about ½-inch in diameter. The shape of the support can be in the form of extruded, briquetted, or tabletted cylinders, polylobal extrusions, spheres, rings, hollow core cylinders, or any other appropriate geometric shape. The different forming techniques will require mixes with different moisture contents.

Impregnation of the calcined carrier with the aqueous solution of Group VI and Group VIII metal salts can be effected by any known technique by mixing the calcined carrier with a given amount of the aqueous solution for a given period of time. The incipient wetness technique is particularly useful. The solution penetrates into the carrier and fills the pores of the carrier.

After the calcined carrier support has been impregnated with the Group VI and VIII metals, for example, the impregnated support is dried and calcined to convert the metals to metal oxides. Any type of drier and drying temperature can be used so long as the extrudates are dried sufficiently so that they do not break up on calcination. It is possible in some instances to effect a one-step drying-calcination if a proper time-temperature cycle is established. Calcination temperatures of at least about 400° C. up to about 800° C. can be used. Both under-calcination and over-calcination generally are detrimental. Any type of calciner, such as a rotary kiln, tunnel kiln, vertical calciner, etc., can be used as long as the metals are converted to metal oxides.

It also is possible in some instances, to prepare the hydrotreating catalyst by combining all portions of the active ingredients into a mix followed by forming, drying and calcination. In another embodiment, a mixture of the above type may be prepared in which a part of the metals has been added to the mixture, and after forming and calcining, the balance of the metals is added via impregnation followed by drying and calcination.

The hydrotreating catalysts of the present invention which may be prepared by any of the techniques described above are characterized as having acceptable crushing strengths (15–40 pounds), median pore radii of from about 30 to about 65 Angstroms, total pore volume of from about 0.2 to about 0.5 cc/g. and surface areas of from about 115 to about 180 $m^2/g$. Although all of these physical properties are important, the median pore radius, total pore volume and surface area of the catalysts are particularly significant with regard to the effectiveness of the hydrotreating catalysts. In one embodiment, the median pore radius is from about 35 to about 55 Angstroms and the surface area of the catalysts is from about 120 to about 170 $m^2/g$.

The hydrotreating catalysts of the invention also are characterized as having intermediate surface acidity. Generally, the surface acidity will be below about 11 cc/g. as measured by ammonia chemisorption, and more often will be between about 7 or 8 to about 10 or 11. The hydrotreating catalysts of the invention also are characterized as containing essentially no macropores. Macropores are defined in the art as pores greater than 600A° in diameter. The macropore volume content of the preferred catalysts of the invention generally is less than about 0.040 cc/g. and more often is less than 0.020 or 0.010 cc/g. Typically, the macropore volume content is 0.000 to 0.005 cc/g.

The following examples illustrate the preparation of the hydrotreating catalysts of the present invention including the preparation of the carrier supports. Unless otherwise indicated in the examples or elsewhere in the specification and claims, all parts and percentages are by weight, and temperatures are degrees centigrade. The surface areas, pore volumes, and pore diameters are measured by mercury intrusion porosymmetry.

EXAMPLE 1A

Into a mixer there is charged 15 pounds of hydrated alumina available from Condea Chemie under the trade designation Pural ® SB (boehmite) and 15 pounds of Versal ™ 250 alumina (boehmite/pseudoboehmite) available from Kaiser Aluminum and Chemical Corporation. The aluminas are mixed to uniformity for about 2 to 3 minutes. In a separate vessel, a solution is prepared by mixing 20 pounds of water, 120 pounds of 70% nitric acid and 1.57 pounds of 24.63% $H_2SiF_6$. The solution is added to the alumina blend and mixed thoroughly. Additional water may be added to the mixture to adjust the volatile content of the mixture to about 58%, and mixing is continued until the desired plasticity is achieved (an extrudable mixture). The mixture then is extruded using a Welding Engineers Extruder equipped with a die plate with 0.070-inch diameter round holes. The extrudate is dried overnight at 125° C. and then calcined in a rotary furnace at 670°–700° C. to develop a surface area of about 200–210 $m^2/g$. The catalyst support prepared in this manner has the following typical analyses and properties.

| | |
|---|---|
| F | 3.4% |
| $SiO_2$ | 2.5% |
| $Al_2O_3$ | 95.8% |
| surface area | 215 $m^2/g$ |
| pore volume | 0.75 cc/g |
| median pore radius | 68 A° |

| | |
|---|---|
| crushing strength | 20 pounds |
| diameter | 0.063 inches |

EXAMPLE 1B

An aqueous impregnating solution is prepared at a concentration which yields in the finished catalyst composition, 6% nickel and 19% tungsten. The solution is prepared by dissolving 1583.2 grams of ammonium metatungstate and 1853.7 grams of nickel nitrate hexahydrate ($Ni(NO_3)_2 \cdot 6H_2O$) in a sufficient amount of water to yield 3360 cc of the solution which is the approximate pore volume in 4000 grams of the calcined support prepared in Example 1A. The resulting solution is mixed until clear. A support prepared as in Example 1A (4000 grams) is then impregnated by continuously adding the above solution (3360 cc) to the dried extrudate with mixing. The impregnated extrudates are dried overnight at 125° C. and then calcined in a rotary furnace at 500° C. for one hour to convert the metals to oxides. The typical analyses and properties of a catalyst prepared in this manner are as follows:

| | |
|---|---|
| nickel | 6% |
| tungsten | 19% |
| fluorine | 2% |
| $SiO_2$ | 2% |
| surface area | 140 $m^2/g$ |
| total pore volume | 0.46 cc/g |
| median pore radius | 64 A° |
| crushing strength | 30 pounds |
| diameter (ave) | 0.063 inch |

The general procedure of Example 1A is followed utilizing a 50/50 mixture of Pural SB and Versal 250 alumina. The alumina mixture is mixed with an aqueous solution of fluosilicic acid (no nitric acid) to provide 5.0 weight percent $H_2SiF_6$ (calculated on a dry alumina basis). Additional tap water is added over two-minute intervals to achieve the desired mix consistency. The wet mix is then extruded. The extrudate is dried at 125° C. and thereafter calcined in a furnace at 700° C. for one hour with a dry air sweep. The catalyst support prepared in this manner has the following typical analyses and properties.

| | |
|---|---|
| F | 3.65% |
| $SiO_2$ | 2.3% |
| surface area | 204 $m^2/g$ |
| particle density | 1.06 |
| total pore volume | 0.644 cc/g |
| median pore radius | 40.4 A° |
| crushing strength | 31.2 pounds |

EXAMPLE 2B

One kilogram of the calcined support prepared in Example 2A is impregnated with an aqueous solution containing nickel and tungsten by incipient wetness in a one-gallon plastic jar. Following 12 hours of drying at 125° C., the dry, impregnated precursor is fired at 500° C. for one hour with a dry air sweep. The catalyst prepared in this manner has the following typical analyses and properties.

| | |
|---|---|
| nickel | 5.9% |
| tungsten | 19.4% |
| fluorine | 2.4 |
| $SiO_2$ | 2.0 |
| surface area | 141 $m^2/g$ |
| total pore volume | 0.402 |
| median pore radius | 41.8 A° |
| crushing strength | 33.7 pounds |
| diameter (avg.) | 0.058 inch |

EXAMPLE 3A

The general procedure of Example 2A is repeated utilizing a 50/50 weight percent blend of Plural SB and Versal 250 gelled with 7% of commercial grade fluosilicic acid calculated based upon the fluorine analysis of the particular commercial sample.

The wet mix is extruded through a plastic die plate with 0.070-inch diameter round holes. The extrudate is dried at 125° C. and calcined at 680° C. for one hour with an air sweep. The catalyst support prepared in this manner has the following typical analyses and properties.

| | |
|---|---|
| fluorine | 4.72% |
| surface area | 202 $m^2/g$ |
| median pore radius | 38.9 A° |

EXAMPLE 3B

The catalyst support prepared in Example 3A is impregnated with an aqueous solution containing nickel and tungsten by the incipient wetness technique and the general procedure described in Example 1B. The impregnated extrudates are dried at 125° C. and calcined at 500° C. The typical analyses and properties of the catalyst prepared in this manner are as follows:

| | |
|---|---|
| nickel | 5.77% |
| tungsten | 19.3% |
| fluorine | 3.31% |
| $SiO_2$ | 1.32% |
| surface area | 125 $m^2/g$ |
| crushing strength | 47.5 pounds |
| median pore radius | 41.6 A° |
| diameter (avg.) | 0.058 |

The hydrotreating catalysts of the present invention are useful in the upgrading of crude hydrocarbon oil stocks or partially hydrotreated crude stocks and in producing lubricating oils or lubricating oil base stocks by way of catalytic hydrogenation. The crude hydrocarbon oil stocks treated with the catalysts of the present invention and in accordance with the process of the present invention may be any of the oil stocks commercially available and known in the art including gas oils and heavy gas oils. The crude lubricating oil stocks which can be hydrotreated with the catalysts of the present invention include oil stocks usually boiling predominantly above 600° F. or 650° F. and include stocks ranging from light distillates to heavy gas oils obtained from vacuum or atmospheric towers. Examples of crude oils which can be hydrotreated with the catalysts and process of the invention include heavy vacuum gas oils such as Sumatran Light, Arabian Light, Kuwait, Sumatran Heavy, California Light, California Heavy, etc.

The catalysts of the invention are particularly effective in the treatment of crude lubricating oil stocks which have been obtained from a residual material which has been treated to lower the sulfur, nitrogen and asphaltene contents to a level below that of the original residue. One example of such a treated stock is a residual stock which has been deasphalted employing a light paraffinic solvent.

While the catalyst and process of the present invention are suitable to obtain products having viscosity indexes varying over a wide range, the catalyst and process of the invention can be advantageously employed to yield products having comparatively high viscosity indexes. For example, the catalysts and process of the invention can be used to yield products having viscosity indexes in the range of from about 100 to about 125 or higher in higher yields and at lower reaction temperatures. It should also be noted that the production of an oil having an enhanced viscosity index can be achieved without sacrificing other desirable features of the process such as, for example, high yield of oil, or other desirable characteristics of the oil such as low aromatic content.

The hydrotreating process of the present invention utilizing the hydrotreating catalyst of the present invention may be conducted at temperatures in the range of from about 250° C. to about 500° C., more specifically within the range of from about 300° C. to about 425° C. Reactions also are conducted under pressures in the range of from about 1500 to about 5000 psig and more specifically in the range of from about 2000 to about 3000 psig. The liquid hourly space velocity (LHSV) can be varied over a wide range although generally from about 0.1 to about 10 volumes of crude lubricating oil stock per volume of catalyst per hour, and a hydrogen feed rate of from about 2000 to about 20,000 standard cubic feet (scf) per barrel of crude lubricating oil stock and preferably from about 4000 to about 10,000 scf of hydrogen per barrel of crude oil stock are maintained during the reaction. It is not necessary that pure hydrogen be employed in the process, and a hydrogen-containing stream comprising from about 60% to about 99% of hydrogen is satisfactory. The hydrogen-containing streams generally available in refinery operations contain from about 85% to about 95% of hydrogen gas, and such streams are useful.

The particular operation conditions to be used in any specific hydrotreating operation will, of course, vary to a certain extent depending upon the properties of the charge stock being treated and the results desired. Accordingly, the operating conditions to be employed in the hydrotreating process should be selected so as to produce a hydrotreated material having the desired characteristics including higher viscosity index and reduced aromatics, sulfur and nitrogen content. Also, the operating conditions employed in the hydrotreating process must be selected, in conjunction with the catalyst, to reduce a degree of random carbon-to-carbon cleavage typical of hydrocracking and to minimize production of substantial amounts of lower boiling materials.

As mentioned above, the hydrotreating catalysts of the present invention are useful in treating crude oils for improving the viscosity index and reducing the amount of aromatics present. In practice, lubricating oil producers generally use multiple hydrotreating steps or stages on the crude oils. Generally, the function of the first stage is to improve the viscosity index of the lubricating oil (via hydrocracking) and to remove nitrogen, sulfur and metals. The second stage affects hydrogenation of the oil (which is generally dewaxed between the first and second stage) to improve its stability. Stabilization involves the conversion of unsaturated hydrocarbons such as olefins and aromatics to saturated materials such as paraffins and naphthenic materials. Stabilization, to a lesser extent, also involves removing objectionable elements from the lubricating feedstocks, and such impurities usually consisting of sulfur, nitrogen, oxygen, halides and trace metals.

In a one stage or single pass operation, the oil and hydrogen generally are preheated to reaction temperature and passed through a series of catalyst beds in one or more reactors. The reactor effluent is cooled and separated into gas and liquid streams. Unreacted hydrogen is recycled. Since the overall reaction is exothermic, the temperature rise in each catalyst bed is controlled by either gas quench, liquid quench or indirect cooling between beds. The liquid stream passes to an atmospheric stripper where gaseous hydrocarbons and light fractions are removed. The bottoms fraction is charged to a vacuum tower for separation into the desired waxy lube products.

Although single stage operations are effective in hydrotreating crude oil base stocks, most commercial lubricating oil producers utilize multiple stage and multiple catalyst systems to achieve the desired conversion of the various aromatic-containing lubricating oil feedstocks to oils having the desired properties. Generally, multiple stage preparations will consist of two and sometimes three hydrogenation stages. FIG. 1 is a schematic flow diagram of a two stage process for hydrotreating a lubricating oil base stock. Because of the different catalytic functions of each of the stages, current practice requires the use of different catalysts in the two stages. The primary alteration of the components of the feedstock is accomplished in the first stage where a significant amount of cracking occurs in conjunction with hydrotreating. There is some reduction of aromatic content. As a result of these changes, the oil undergoes a desirable increase in the viscosity index. Thus, the performance of the first stage is measured by the yield and the viscosity index of the effluent. Some purification of the oil also occurs in the first stage. Thus, sulfur compounds are converted into hydrogen sulfide and other compounds through various desulfurization reactions. Nitrogen compounds are converted into ammonia and pure hydrocarbons through various denitrogenation reactions, and naphthenic acids are converted into naphthenes through various dehydration and decarboxylation reactions. As a result, the reactor effluent from the first stage shows a marked improvement in color, thermal stability and oxidation stability with some decrease in aromatic content.

In the second stage the hydrotreating catalyst saturates the desired aromatic compounds with emphasis on the 4, 5, 6 and greater aromatic rings. These hydrogenation reactions increase the naphthenic content of the oil. There is little or no change in the viscosity index of the oil as a result of the second stage treatment. When compared to the first stage, the second stage is more of a finishing or polishing step where mild hydrogenation occurs and product stability is improved.

FIG. 1 illustrates one two-stage process which is typical of two-stage processes currently being used for hydrotreating lubricating oils. In the process illustrated in FIG. 1, vacuum gas oil 10 (VGO) and hydrogen ($H_2$) 12 are fed to the first-stage reactor 14 which contains a hydrotreating catalyst. In a typical process, the pressure in the first stage is about 3000 psig and temperatures are in the range of 700°–800° F. The effluent from the first-stage reactor 16 is subjected to vacuum distillation 18 to remove volatile materials, and the residue 20 is subjected to a solvent de-waxing step in a suitable apparatus 22 utilizing procedures well known to those skilled in the art. The de-waxed oil (DWO) 24 is mixed with additional hydrogen 26 and fed to the second stage reactor 28 which also contains a hydrotreating catalyst. Typically, the second stage reactor is operated at a temperature of from about 500° F. to about 600° F. at a pressure of about 3000 psig. The effluent from the second-stage reactor 30 is the desired lubricating oil base stock.

As mentioned above, prior art processes generally have utilized different hydrotreating catalysts in the first and second stage reactors because of the two different processes and reactions which occur in the two stages. One of the unique features of the hydrotreating catalysts of this invention is that the catalyst can be used effectively in both stages, and, therefore, the use of the catalysts of this invention in both stages simplifies the hydrotreating processes and eliminates the need for maintaining an inventory of two separate catalysts. It has been discovered that the catalyst of the present invention is effective in a first-stage operation such as illustrated in FIG. 1, and the use of the catalyst results in effluents having excellent characteristics which are generally improved over the characteristics obtained with some of the presently commercially utilized catalysts. In general, at given viscosity indexes, increased yields are obtained, and denitrogenation, dearomatization and desulfurization are superior. When used in the second stage of a two-stage hydrotreating process such as illustrated in FIG. 1, the catalyst of the present invention, as compared to some commercially available second-stage catalyst, results in increased removal of aromatics in the lubricating oil at lower operating temperatures.

The utility of the hydrotreating catalyst of the present invention on heavy gas oils is illustrated in the following example conducted on a Kuwait heavy vacuum gas oil (HVGO).

The Kuwait heavy vacuum gas oil is characterized as follows:

| | |
|---|---|
| gravity, API | 18.4 |
| sulfur content (wt. %) | 3.52 |
| nitrogen content (ppm) | 1390 |
| aromatic content (wt. %) | 64 |
| D-1160 vacuum dist., °F. | |
| (% over) | |
| 5 | 715 |
| 10 | 870 |
| 30 | 969 |
| 50 | 997 |
| 70 | 995 |
| 90 | 1050 |

For comparison purposes, the process also is conducted on the Kuwait HVGO utilizing commercially available hydrotreating catalysts for the first and second stages such as described in U.S. Pat. Nos. 3,078,238 and 3,046,218. The catalyst of the present invention utilized in this example is similar to the catalyst described in Example 1B.

The first stage reaction conditions utilized in this example are: temperature, 385°–400° C.; pressure, 2500 psig.; LHSV, 1.0 vol./vol./hr.; hydrogen flow rate, 7500 SCF/Bbl. When compared to a commercially available catalyst, the catalyst of Example 1B increases the yield of high viscosity index effluent and results in an increased reduction in the aromatics content, nitrogen content and sulfur content of the effluent, and a more stable effluent.

After vacuum distillation and solvent dewaxing of the effluent from the first stage, the effluent is subjected to a second stage hydrotreating process as illustrated in FIG. 1 utilizing the catalyst of Example 1B as representative of the catalyst of the present invention. For comparison, the process also is conducted utilizing a commercially available catalyst generally recommended for use in such second stage reactor. The reaction conditions of the second stage are: temperature, 500°–550° F.; pressure, 2500 psig.; LHSV, 0.5 vol./vol./hr.; and hydrogen flow rate, 5000 SCF/Bbl.

The goal of the second stage lube finishing is to impart stability against oxidation. Various criteria can be used to evaluate stability, and two common ones are aromatics content and UV absorbance. The results of this second stage reaction utilizing the catalyst of Example 1B compared to the commercially available catalyst demonstrate that the catalyst of the present invention produces an effluent oil containing significantly less aromatics, and the amount of aromatic contained in the effluent is reduced as the reaction temperature is increased from 500° to 525° and 550° F. The UV light stability of the effluent from the second stage utilizing the catalyst of the present invention is significantly improved over the UV light stability of the effluent obtained utilizing the commercial catalyst in the second stage.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for enhancing lubricating oils and improving their viscosity index and/or reducing the aromatic content of the oil which comprises contacting a crude lubricating oil stock with hydrogen under hydrogenating conditions including elevated temperatures and pressures in the presence of the hydrotreating catalyst comprising at least one Group VI metal, metal oxide, or metal sulfide, or mixtures thereof, and at least one Group VIII metal, metal oxide, or metal sulfide, or mixtures thereof, supported on a carrier wherein (A) the catalyst comprises from about 10% to about 35% by weight of combined metal, and the atomic ratio of the Group VIII metal to Group VI metal is in the range of from about 0:5:1 to about 2:1;

(B) the carrier comprises from about 0.5 to about 10 weight percent of halogen, from about 0.5 to about 5% by weight of silica, and from about 85 to about 99% of alumina; and (C) the catalyst is characterized as having a median pore radius of from about 30 to about 65 Angstroms, and a surface area of from about 115 to about 180 m²/g.

2. The process of claim 1 wherein the crude lubricating oil stock is a vacuum gas oil or a deasphalted residuum.

3. The process of claim 1 wherein the contacting is conducted at a temperature in the range of from about 250° C. to about 500° C. and the pressure is in the range of from about 1500 to about 5000 psig.

4. The process of claim 1 wherein the hydrotreating catalyst contains from about 20 to about 30% by weight of combined metal.

5. The process of claim 1 wherein the atomic ratio of the Group VIII metal to Group VI metal in the hydrotreating catalyst is about 0.75 to about 1.25.

6. The process of claim 1 wherein the halogen in the hydrotreating catalyst is fluorine.

7. The process of claim 1 wherein the hydrotreating catalyst comprises from about 1% to about 2.5% by weight of silica.

8. The process of claim 1 wherein the hydrotreating catalyst is sulphided prior to use.

9. The process of claim 1 wherein the carrier is prepared by the process which comprises the steps of
   (A) preparing a solution of fluosilicic acid in water;
   (B) preparing a mixture of alumina and the solution prepared in step (A);
   (C) forming the mixture to form a desired shape; and
   (D) drying and calcining the formed mixture at an elevated temperature.

10. The process of claim 9 wherein the solution prepared in step (A) also contains a mineral acid.

11. The process of claim 10 wherein the mineral acid is nitric acid.

* * * * *